Nov. 12, 1935.  K. E. STUART  2,020,588
FLUID FLOW METER
Filed Oct. 31, 1932

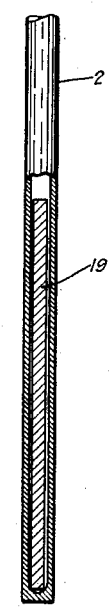
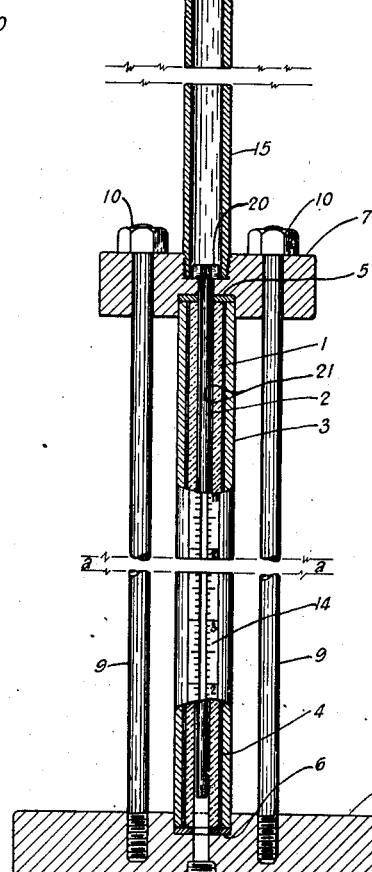

INVENTOR
Kenneth E. Stuart

Patented Nov. 12, 1935

2,020,588

UNITED STATES PATENT OFFICE 2,020,588

FLUID FLOW METER

Kenneth E. Stuart, Merion, Pa., assignor to Hooker Electrochemical Company, Niagara Falls, N. Y., a corporation of New York Application October 31, 1932, Serial No. 640,399

2 Claims. (Cl. 73—167)

My invention relates to flow meters of the type characterized by a variable flow passage, in which the pressure differential is constant, as distinguished from those depending upon an invariable orifice, in which the pressure differential is a function of the rate of flow.

In flow meters of the variable orifice type, it has generally been customary to employ a piston closely fitting a cylindrical barrel, the movement of the piston uncovering a passage of progressively increasing cross section, or else to employ a piston in a barrel of increasing or tapered cross section, the flow being through an annular space the area of which varies with the position of the piston. In the former case, friction between piston and barrel constitutes a large factor of error. In the latter case, because of difficulties of manufacture, the tapered barrel is an expensive adjunct, especially when made of glass. In my flow meter, on the other hand, there is no closely fitting piston to introduce friction or tapered barrel to involve excessive cost, the flow being through an annular passage of variable length. Thus I obtain an extremely sensitive and at the same time simple and inexpensive flow meter which can be easily adapted to corrosive fluids, such as liquid or gaseous chlorine.

Figure 4:
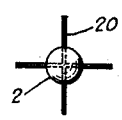
Figure 1:
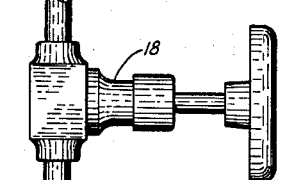
Figure 3:
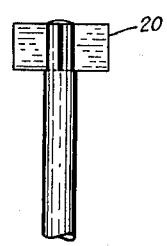
Figure 2:
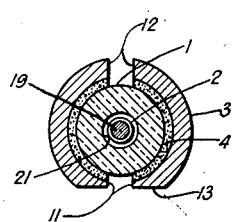

Referring to the drawing: Fig. 1 is an elevation of a typical embodiment of my meter broken away in two places and partly in section; Fig. 2 is an enlarged cross section taken along the line a—a of Fig. 1; Fig. 3 is an enlarged elevation, broken away and partly in section, of the plunger which constitutes the indicating element of the meter; and Fig. 4 is a plan view of the upper end of the plunger.

Referring to Fig. 1, 1 is the cylindrical barrel element, consisting, in this case, of a glass tube of uniform cross section and 2 is the plunger or indicating element. The glass tube 1 is of heavy wall and enclosed in a metal casing 3, the space between glass and metal being filled with cement 4, so that the metal tube serves to reinforce the glass. Both metal and glass tubes are cut to the same length and are pressed against lead washers 5, 6 at their upper and lower ends to make pressure tight joints with the flanges 7 and 8 respectively. The flange 8 serves as a base member. The bolts 9, 9 are screwed into the flange 8 at their lower extremities and the two flanges are drawn against the lead washers 5, 6 by the nuts 10, 10.

Referring to Fig. 2, it will be seen that the metal casing 3 is slotted at 11 and 12, these slots being opposite each other and at the front and rear of the barrel respectively, so as to give clear vision through the glass. The casing 3 is shaped off at 13 to give a flat surface upon which a scale may be engraved, as illustrated at 14, Fig. 1.

Into the flange 7 (Fig. 1) is screwed the tube 15, which is of materially larger diameter than the glass barrel 1. The tube 15 serves to receive the plunger 2 as the latter rises in response to flow.

The fluid enters the meter at 16 and leaves at 17, the flow being regulated by the needle valve 18.

The plunger 2 may be a solid rod or a hollow tube as illustrated in Fig. 3. In this case the plunger may be of some material having a high resistance to corrosion, such as silver, and its specific gravity may be regulated by the introduction of the lead 19 within it, the two ends being afterward closed by silver solder. The upper end of the plunger may be guided in the tube 15 by the spider 20 (shown more clearly in Fig. 4) which is so designed as not to obstruct the flow in the tube 15.

When the needle valve 18 is opened, the fluid starts flowing through the annular passage 21 between the barrel 1 and plunger 2. When the loss of head or pressure differential of the fluid between the initial and final ends of the annular passage 21 exceeds that which must be exerted upon the lower end of the plunger 2 in order to raise the plunger, the latter begins to rise. As it does so, the length of the annular passage 21, and hence the pressure differential, diminish. The plunger 2 continues to rise until it reaches a point at which the pressure differential just equals that necessary to support the plunger. At this point the plunger ceases to rise and floats in equilibrium under dynamic suspension. There is therefore a definite point, corresponding to each rate of flow, at which the plunger is in equilibrium.

Friction between the plunger and barrel is eliminated by the fluid stream on every side.

The diameter of the tube 15 must be sufficiently in excess of that of the barrel 1 to render the drop in pressure in the tube 15 negligible compared with that in the annular passage 21.

If the fluid to be measured is a gas the plunger 2 will be lightly weighted and the annular passage 2 will be relatively large. If the fluid is a liquid the plunger will be heavily weighted and the passage will be relatively small. The weighting of the plunger may, however, be varied to give different ranges of calibration in an instrument of given dimensions. The static lift of the plunger due to liquid displacement is greater at low than at high temperatures, owing to the greater density of the liquid at low temperature. On the other hand, the dynamic lift due to velocity is greater at high than at low temperatures, owing to the greater volume of the liquid at high temperature. Hence these two effects tend to balance each other. With proper attention to design, I find that the temperature variable can be rendered negligible. This is especially important in the case of liquids such as liquid chlorine, which has a very large temperature expansion co-efficient.

What I claim is:

1. A flow meter comprising a barrel of circular cross-section and constant diameter, an inlet for directing a fluid stream therethrough, an elongated member of circular cross-section and constant diameter moving freely therein past the exit end thereof and defining with said barrel a restricted flow passage of annular cross-section and variable length, in the direction of flow, the cross-sectional area of said flow passage being constant in all positions of said member, a chamber adapted to receive said member as it issues from said barrel, an outlet for delivering said fluid from said barrel, whereby said member is supported in said stream at a position responsive to the rate of flow of said fluid, and means for ascertaining the position of said member in said barrel.

2. A flow meter comprising a cylindrical barrel, an inlet for directing a fluid stream through said barrel, an elongated plunger of circular cross-section and constant diameter moving freely within said barrel past the exit end thereof, a clearance between said plunger and said barrel forming a restricted flow passage of annular cross-section and variable length, in the direction of flow, the cross-sectional area of said flow passage being constant in all positions of said plunger, a chamber adapted to receive said plunger and an outlet for delivering said fluid from said barrel, whereby said plunger floats in said stream at a height responsive to the rate of flow of said fluid.

KENNETH E. STUART.